(12) United States Patent
Bryan et al.

(10) Patent No.: US 10,115,092 B1
(45) Date of Patent: Oct. 30, 2018

(54) SERVICE COMPOSITION IN A MOBILE COMMUNICATION DEVICE APPLICATION FRAMEWORK

(71) Applicant: Sprint Communications Company L.P., Overland Park, KS (US)

(72) Inventors: Jeff H. Bryan, Olathe, KS (US); Christine M. Crowell, Olathe, KS (US); Bill G. McCracken, Olathe, KS (US); Roberto Murillo, Blue Springs, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 428 days.

(21) Appl. No.: 15/062,041

(22) Filed: Mar. 4, 2016

(51) Int. Cl.
| | |
|---|---|
| *G06Q 20/12* | (2012.01) |
| *H04W 8/18* | (2009.01) |
| *H04L 29/06* | (2006.01) |
| *H04W 12/06* | (2009.01) |
| *G06Q 20/36* | (2012.01) |
| *G06Q 20/32* | (2012.01) |

(Continued)

(52) U.S. Cl.
CPC ......... *G06Q 20/123* (2013.01); *G06Q 20/327* (2013.01); *G06Q 20/3227* (2013.01); *G06Q 20/367* (2013.01); *H04L 65/60* (2013.01); *H04W 4/50* (2018.02); *H04W 4/80* (2018.02); *H04W 8/18* (2013.01); *H04W 12/06* (2013.01); *G06Q 2220/00* (2013.01)

(58) Field of Classification Search
CPC combination set(s) only.
See application file for complete search history.

(56) References Cited

U.S. PATENT DOCUMENTS 5,528,677 A * 6/1996 Butler ................ H04M 3/4228
                                                                                                  379/196
6,067,299 A * 5/2000 DuRee ................ H04L 49/3081
                                                                                                  370/397

(Continued)

OTHER PUBLICATIONS

Bryan, Jeff H., et al., "Security Tiering in a Mobile Communication Device Application Framework," filed Dec. 1, 2015, U.S. Appl. No. 14/956,243.

(Continued)

*Primary Examiner* — Mamon Obeid

(57) ABSTRACT

A method of providing a mobile application service on a user equipment based on composing a plurality of services supported by service platforms executing in a backend of a communication network. The method comprises receiving a request for a content service from a mobile application executing on a user equipment (UE) by a mobile application framework (MAF) and verifying the request for the content service by the MAF through a communication service provider platform, wherein the communication service provider platform completes verification in part by invoking a service of the MAF. The method further comprises completing a payment transaction for the content service by the MAF through messaging a payment platform, wherein the payment platform iteratively invokes services of the MAF and ordering the content service delivery by the MAF through messaging a content provider platform, wherein the content provider platform iteratively invokes services of the MAF.

7 Claims, 12 Drawing Sheets

(51) Int. Cl.
*H04W 4/50* (2018.01)
*H04W 4/80* (2018.01)

(56) References Cited

U.S. PATENT DOCUMENTS

| | | | | |
|---|---|---|---|---|
| 6,294,848 | B1* | 9/2001 | Goodrich, II | H02M 3/156 307/147 |
| 7,248,855 | B2* | 7/2007 | Joyce | G06Q 20/00 455/406 |
| 7,379,731 | B2* | 5/2008 | Natsuno | G06F 21/10 455/412.1 |
| 7,729,994 | B2* | 6/2010 | Gupta | G06Q 20/085 705/51 |
| 8,060,697 | B1* | 11/2011 | Kneisley | G06F 17/30902 707/672 |
| 8,126,439 | B1* | 2/2012 | Sankaranaraynan | H04L 65/1069 455/414.1 |
| 8,135,672 | B1* | 3/2012 | Davis | G06F 17/30902 707/619 |
| 8,326,944 | B1* | 12/2012 | Wick | G06F 8/60 709/218 |
| 8,667,541 | B1* | 3/2014 | Zhu | H04N 21/4524 455/456.2 |
| 8,949,597 | B1* | 2/2015 | Reeves | H04W 12/04 455/422.1 |
| 9,172,541 | B2* | 10/2015 | Kolluru | G06F 21/33 |
| 9,350,877 | B2* | 5/2016 | Lee | H04L 63/0807 |
| 9,521,504 | B1* | 12/2016 | Bryan | H04W 88/06 |
| 9,628,484 | B2* | 4/2017 | Perrone, II | H04L 63/0892 |
| 9,838,379 | B1* | 12/2017 | Bryan | H04W 76/10 |
| 2002/0068545 | A1* | 6/2002 | Oyama | G06Q 30/0601 455/406 |
| 2002/0099663 | A1* | 7/2002 | Yoshino | G06F 21/10 705/65 |
| 2003/0060188 | A1* | 3/2003 | Gidron | G06Q 30/04 455/406 |
| 2003/0097443 | A1* | 5/2003 | Gillett | H04L 29/06 709/225 |
| 2004/0088243 | A1* | 5/2004 | McCoy | G06Q 30/02 705/38 |
| 2004/0260928 | A1* | 12/2004 | Immonen | H04L 63/0823 713/175 |
| 2004/0261093 | A1* | 12/2004 | Rebaud | G06F 21/10 725/25 |
| 2005/0125389 | A1* | 6/2005 | Hazzard | G06Q 10/10 |
| 2006/0242072 | A1* | 10/2006 | Peled | G06Q 30/02 705/51 |
| 2007/0111705 | A1* | 5/2007 | Zhang | H04L 12/14 455/405 |
| 2007/0274481 | A1* | 11/2007 | Guo | G06Q 40/04 379/114.03 |
| 2008/0010379 | A1* | 1/2008 | Zhao | G06Q 20/123 709/226 |
| 2008/0240447 | A1* | 10/2008 | Zhu | H04L 63/0853 380/279 |
| 2009/0144088 | A1* | 6/2009 | Zubiller | G06Q 20/102 705/3 |
| 2010/0199327 | A1* | 8/2010 | Keum | H04N 7/17318 726/3 |
| 2011/0314145 | A1* | 12/2011 | Raleigh | H04L 41/0893 709/224 |
| 2012/0011244 | A1* | 1/2012 | Zhu | G06F 21/105 709/224 |
| 2012/0254290 | A1* | 10/2012 | Naaman | H04L 67/303 709/203 |
| 2012/0314632 | A1* | 12/2012 | Martinez De La Cruz | H04L 65/1046 370/310 |
| 2014/0165178 | A1* | 6/2014 | Perrone, II | H04L 63/0892 726/9 |
| 2014/0236747 | A1* | 8/2014 | Tokita | G06Q 30/06 705/26.1 |
| 2014/0359738 | A1* | 12/2014 | Nakajima | H04L 63/08 726/7 |
| 2015/0006404 | A1* | 1/2015 | Beidl | H04L 63/062 705/71 |
| 2015/0079926 | A1* | 3/2015 | Gonzalez Plaza | H04M 15/66 455/406 |
| 2015/0117388 | A1* | 4/2015 | Liu | H04W 72/082 370/329 |
| 2015/0223265 | A1* | 8/2015 | Fwu | H04W 52/04 370/329 |
| 2017/0310493 | A1* | 10/2017 | Wang | H04L 12/1407 |
| 2018/0063564 | A1* | 3/2018 | Phatak | H04N 21/25816 |

OTHER PUBLICATIONS

Bryan, Jeff H., et al., "Channel Selection in a Mobile Communication Device Application Framework," filed Dec. 2, 2015, U.S. Appl. No. 14/956,468.
Notice of Allowance dated Aug. 14, 2017, U.S. Appl. No. 14/956,243, filed Dec. 1, 2015.
FAIPP Pre-Interview Communication dated Jul. 5, 2016, U.S. Appl. No. 14/956,468, filed Dec. 2, 2015.
Notice of Allowance dated Aug. 8, 2016, U.S. Appl. No. 14/956,468, filed Dec. 2, 2015.

* cited by examiner

SERVICE COMPOSITION IN A MOBILE COMMUNICATION DEVICE APPLICATION FRAMEWORK

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices are becoming increasingly powerful and widely used. Many mobile devices are able to download and install mobile applications, sometimes called user applications or third party applications, after the device has been purchased and activated for mobile communication service. These mobile applications may provide some of their functionality based on communicating with application servers in the Internet. Sometimes mobile applications may provide a kind of bundled service that combines functionality from multiple third party providers.

SUMMARY

In an embodiment, a method of providing a mobile application service on a user equipment based on composing a plurality of services supported by service platforms executing in a backend of a communication network is disclosed. The method comprises receiving a request to perform a service from a mobile application executing on a user equipment (UE) by a mobile application framework, wherein the mobile application framework executes on at least one processor and verifying the request to perform the service from the mobile application by the mobile application framework by sending a message with information about the UE and the requested service to a first service platform and receiving a message from the first service platform authorizing the mobile application service request. The method further comprises completing a payment transaction by the mobile application framework by sending a payment transaction message to a second service platform, where the payment transaction message identifies a user associated with the UE and a third party to receive a payment. The method further comprises ordering a premium service from a third service platform by the mobile application framework, wherein the third service platform is associated with the third party, receiving a premium service token by the mobile application framework from the third service platform, and sending the premium service token by the mobile application framework to the mobile application executing on the UE, whereby the mobile application is enabled by the premium service token to access the premium service from the third service platform.

In another embodiment, a method of providing a mobile application service on a user equipment based on composing a plurality of services supported by service platforms executing in a backend of a communication network is disclosed. The method comprises receiving a request for a content service from a mobile application executing on a user equipment (UE) by a mobile application framework, wherein the mobile application framework executes on at least one processor and the request is received via an application programming interface (API) of the mobile application framework and verifying the request for the content service by the mobile application framework through a communication service provider platform, wherein the communication service provider platform completes verification in part by invoking a service of the mobile application framework via the mobile application framework API. The method further comprises completing a payment transaction for the content service by the mobile application framework through messaging a payment platform, wherein the payment platform iteratively invokes services of the mobile application framework API in support of making payment and ordering the content service delivery by the mobile application framework through messaging a content provider platform, wherein the content provider platform iteratively invokes services of the mobile application framework API in support of completing the content service order.

In yet another embodiment, a method of providing a bundled content delivery communication service on a user equipment (UE). The method comprises receiving a request for a bundled content delivery communication service from a mobile application executing on a user equipment (UE) by a mobile application framework server application executing on a server computer, wherein the request for bundled content delivery comprises an identity of the mobile application, an identity of the UE, and an identity of a bundled content delivery service. The method further comprises mapping the identity of the mobile application and the identity of the bundled content delivery service by the mobile application framework server application to a mobile application framework content delivery workflow, validating the UE with a wireless communication service provider by the mobile application framework server application based on the mapped mobile application framework content delivery workflow, in response to validating the UE, determining a payment service by the mobile application framework server application based on the mapped mobile application framework content delivery workflow, and determining a content provider for the bundled content delivery service based on the mapped mobile application framework content delivery workflow. The method further comprises completing a payment transaction with the payment service by the mobile application framework server application, wherein the payment transaction comprises the mobile application framework server application providing an indication of having validated the UE and an identity of the content provider, ordering the bundled content delivery service from the content provider by the mobile application framework server application, wherein the mobile application framework server application provides an indication of the completion of payment by the payment service to the content provider, and receiving a content delivery service token from the content provider by the mobile application framework server application, wherein the content delivery service token enables the UE to access the content delivery service. The method further comprises identifying an access point node (APN) by the mobile application framework server application based on the mapped mobile application framework content delivery workflow, wherein the APN is associated by the wireless communication service provider with a communication channel over which communication is not tolled to subscriber service accounts and transmitting the content delivery service token and the APN identity by the mobile application framework server application to mobile application on the UE, whereby the mobile application is configured to provide premium content via the UE responsive to a selection input to the UE.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
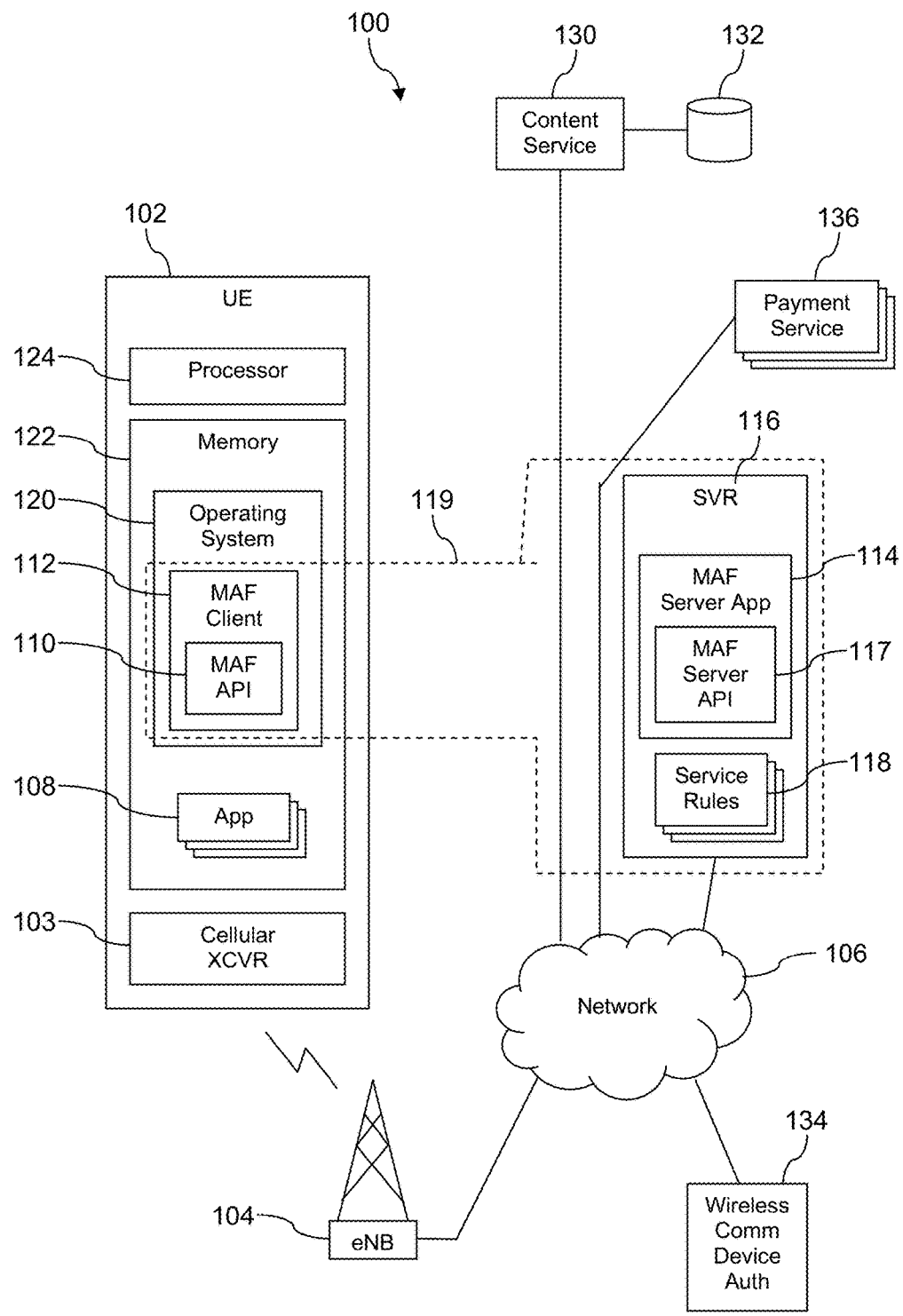
FIG. 1 is a block diagram of a communication system.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a mobile application framework that provides an extensible framework for providing communication services to mobile applications that execute on a user equipment (UE). A UE may be a mobile phone, a personal digital assistant (PDA), a media player, a wearable computer, a headset computer, a laptop computer, a notebook computer, or a tablet computer. The mobile application framework provides a variety of security services and context driven data communication channel selection in support of mobile applications. For further details about mobile application framework security services, see U.S. patent application Ser. No. 14/956,243 filed Dec. 1, 2015, titled "Security Tiering in a Mobile Communication Device Application Framework," by Jeff H. Bryan, et al., which is incorporated herein by reference in its entirety. For further details about mobile application framework communication channel selection services, see U.S. patent application Ser. No. 14/956,468, filed Dec. 2, 2015, and titled "Channel Selection in a Mobile Communication Device Application Framework," by Jeff H. Bryan, et al., which is incorporated herein by reference in its entirety.

The mobile application framework further provides support for bundled communication services that are invoked from a mobile application executing on the UE and that engage a plurality of other loosely coupled services or computer systems to compose the bundled communication service. The mobile application framework provides a uniform but extensible application programming interface (API) for communicating with services and computer systems that may be referred to as backend systems to distinguish them from the mobile application executing on the UE and from a radio access network (RAN) that provides wireless communication coupling of the UE to a core network. The mobile application framework may be configured with a rule or service delivery template that enables the mobile application framework to support a category or family of specific bundled communication services. Backend systems that cooperate to provide the bundled communication service interwork with the uniform API extended by the mobile application framework without integrating with each other, thereby easing the level of difficulty in composing and deploying new communication services.

For example, one category or family of bundled communication service may comprise buying delivery of electronic content such as a streamed movie or premium content associated with an event such as a professional football game. The bundled service may combine providing the content from a content provider, payment using a payment broker, validation of the UE and/or user by a wireless communication service provider, and delivery over a communication channel that does not aggregate data usage to the UE user's service account. Providing this bundled communication service may engage a content provider, a payment broker, and a wireless communication service provider. These several backend systems need not integrate with each other but instead can interact with the mobile application framework API. The mobile application framework can be viewed as an improved computer system and/or an improved communication system in that it provides simplified communication pathways for composing the communication service offered to the mobile communication device. Instead of the backend systems integrating with each other and creating a spaghetti-like network of communications links that may be difficult to manage and difficult to secure, these same communications are handled by the mobile application framework. Further, the mobile application framework improves security by integrating tiered security into the mobile application framework API access by mobile applications (e.g., as described more fully in U.S. patent application Ser. No. 14/956,243 "Security Tiering in a Mobile Communication Device Application Framework) and resolves intermediate information technology challenges by playing an interactive mediation role for a plurality of service sets (i.e., a uniform framework for different possibly unrelated service sets, where a service set may be composed from a plurality of cooperating but independent services).

It will be appreciated that this category or family of bundled communication service may readily be applied to providing a variety of different types of content, engaging a variety of different content providers and using a variety of different payment brokers. The bundled service may be said to be a composition of the services provided by each of the backend systems. Other categories, families, or templates of bundled or composed communication services can be defined and the API of the mobile application framework can readily be extended to support these additional categories of bundled communication services, for example by defining new service rules or service templates.

The mobile application framework API can support iterative service invocation in providing bundled services. For example, in brokering payment, a payment broker may receive a request from the mobile application framework to make a payment from a designated payment account (from an account associated with the user of the UE) to a content provider. The payment broker may in response invoke a different method of the API to obtain more information about the user or UE. Is the UE authenticated? In response to this iterative or nested invocation of the mobile application framework API, the mobile application framework may communicate with the mobile application and/or with the UE to pop-up an interface on the UE to prompt the user to input a personal identification number (PIN) or to provide a biometric signature to the UE such as a thumbprint or fingerprint. The mobile application framework may invoke yet another method (an additional layer of nesting) to a mobile communication service provider to verify that the subject UE is validated into the communication network and is not being spoofed in some way. The mobile application framework API can reply with a positive authentication response to the payment broker. The payment broker can transfer funds to the content provider and send a payment complete message back to the mobile application framework, thereby completing the original iterative or nested invocation of the mobile application framework API. Like nested mobile application framework API calls may be performed with the content providers and with other backend systems, as described further hereinafter.

In an embodiment, the mobile application framework comprises a mobile application framework client providing an API facing to the mobile application and executing on a UE and a mobile application framework server application providing an API facing to backend systems and executing on a server in a core network. Alternatively, in an embodiment, the mobile application framework comprises a mobile application framework client providing an API facing to the mobile application and a mobile application framework server application providing an API facing to backend systems, where both the mobile application framework client and the mobile application framework server application execute on the UE. It will be appreciated that these two different implementations may have advantages and disadvantages that make one solution better in one deployment scenario and make the other solution better in a different deployment scenario. It is observed that maintaining the distinction between client functionality and server functionality even when both functionalities are provided on the UE may have architectural benefits, for example isolating backend systems from mobile applications and vice versa.

Turning now to FIG. 1, a communication system 100 is described. In an embodiment, system 100 comprises a user equipment (UE) 102, an enhanced node B (eNB) 104, and a network 106. The eNB 104 may be referred to as a base transceiver station (BTS) or a cell tower. The eNB 104 provides a wireless communication link to a cellular transceiver 103 of the UE 102 according to a long term evolution (LTE), a code division multiple access (CDMA), a global system for mobile communications (GSM), a worldwide interoperability for microwave access (WiMAX), or other cellular wireless communication protocol. Alternatively, a wireless access point (AP) (not shown) may provide a short range wireless link such as WiFi or Bluetooth® to the UE 102 and couple the UE 102 to the network 106. Alternatively, the UE 102 may be coupled to the network 106 by a wired link, for example by a coaxial cable or other wired link. The network 106 may be one or more private networks, one or more public networks, or a combination thereof. The UE 102 may be a mobile phone, a personal digital assistant (PDA), a wearable computer, a headset computer, a media player, a gaming system, a set-top box, a laptop computer, a tablet computer, or a notebook computer.

The UE 102 comprises one or more mobile applications 108 installed in a memory 122 of the UE 102. The mobile applications 108 may be applications for consuming digital content, for example for watching movies, listening to audio, browsing pictures. The mobile applications 108 may be applications that support game playing, for example interactive gaming or on-line gaming. The mobile applications 108 may provide other communication services. In some contexts, the mobile applications 108 may be said to provide communication services and/or premium communication services.

In some contexts one or more of the mobile applications 108 may be referred to as user applications or user installed applications. Some mobile applications 108 may be provided with the UE 102 in an out-of-box state, for example the mobile applications 108 may be installed by a wireless communication service provider or by an original equipment manufacturer (OEM) of the UE 102 before activation of the UE 102. The UE 102 further comprises a mobile application framework client 112 that provides a mobile application framework application (MAF) programming interface (API) 110. In an embodiment, the mobile application framework (MAF) client 112 may be embedded in an operating system 120 of the UE 102, but in other embodiments the mobile application framework client 112 may be outside of the operating system 120 and may be a system application or stored in a system partition of the memory 122. Alternatively, the mobile application framework client 112 may be stored in a carrier partition of the memory 122.

One or more of the mobile applications 108 may be on-boarded with a mobile application framework (MAF) server application 114 that executes on a server 116 or with a different server in an enterprise domain or in a wireless communication service provider domain. On-boarding may comprise assignment of a mobile application identity to the mobile application 108 that may be built into the mobile application 108. When the mobile application 108 invokes a method of the mobile application framework API 110, the mobile application 108 provides its identity or the mobile application framework API 110 may look this identity up in the memory 122 or via the operating system 120. If the mobile application 108 has not been on-boarded successfully, the mobile application framework API 110 may not perform the method invoked by the mobile application 108 or the mobile application framework API 110 may allow access of the mobile application 108 to a limited sub-set of mobile application framework API 110 methods.

A mobile application framework 119 may be said to comprise the mobile application framework client 112 and the mobile application framework API 110 on the UE 102 and the mobile application framework server application 114, a mobile application framework server API 117, and one or more mobile application framework service rules 118 on the server 116. It is understood that the system 100 may comprise any number of UEs 102 and any number of eNBs 104. Thus, the mobile application framework 119 may be considered to include the mobile application framework clients 112 and mobile application framework APIs 110 on a large number of UEs 102 and the mobile application framework server application 114, the mobile application framework server API 117, and the one or more mobile application framework service rules 118 on the server 116. It is understood that the server 116 may comprise a computer system that is provided by one or more physical servers or by a cloud computing system.

Figure 2A:
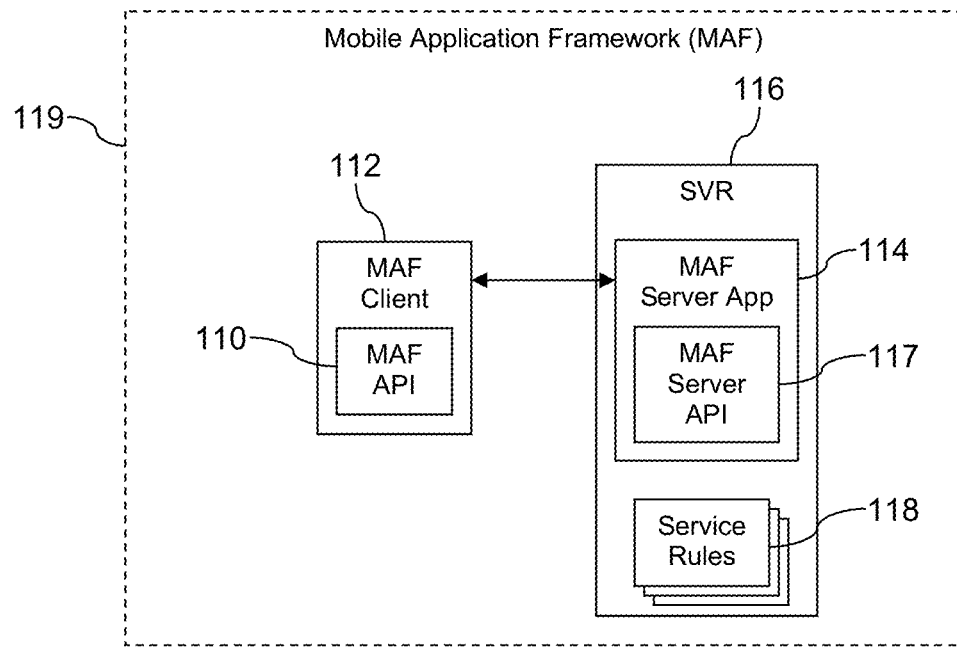
FIG. 2A is a block diagram of a first architecture of a mobile application framework according to an embodiment of the disclosure.
Figure 2B:
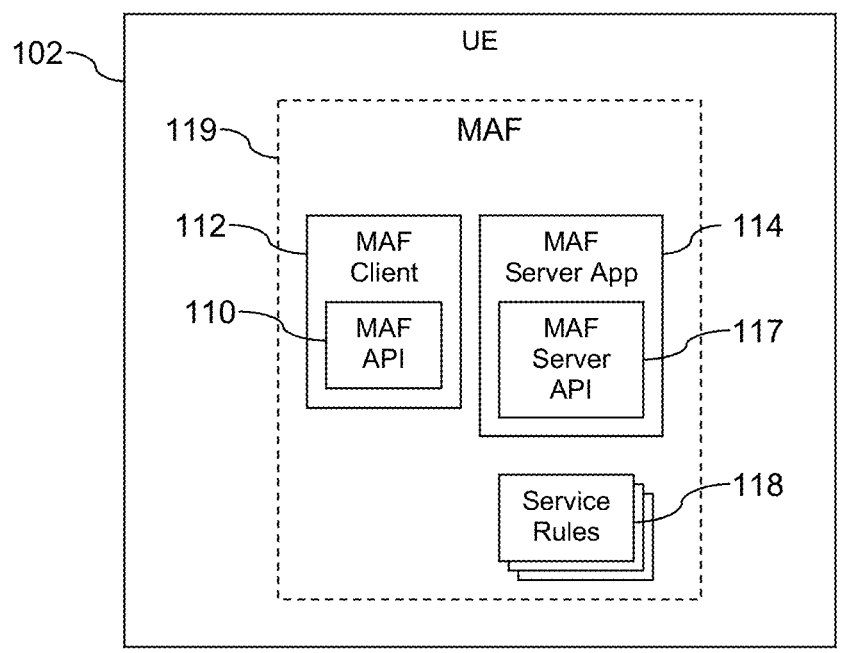
FIG. 2B is a block diagram of a second architecture of a mobile application framework according to an embodiment of the disclosure.

Turning now to FIG. 2A, in an embodiment, the client 112 is located on the UE 102 and the mobile application framework server application 114, the mobile application framework API 117, and the mobile application framework service rules 118 are located on a server 116 separate from the UE 102. Turning now to FIG. 2B, in an alternative embodiment, the mobile application framework server application 114, the mobile application framework server API 117, and the mobile application framework service rules 118 may be installed on the UE 102 (i.e., in an alternative embodiment, as illustrated in FIG. 2B, the mobile application framework 119 may be completely contained within a single UE 102 and independent while like mobile application frameworks 119 may be contained in separate UEs 102).

Figure 2C:
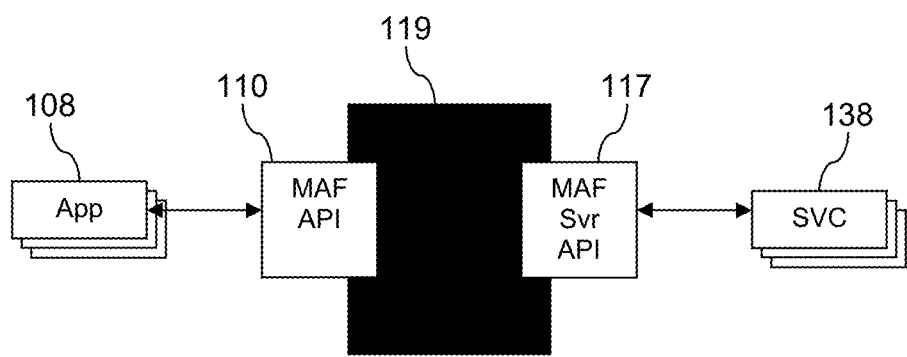
FIG. 2C is a block of a mobile application framework viewed as a "black box" from the perspective of mobile applications and services external to the mobile application framework according to an embodiment of the disclosure.

It is understood that the mobile application framework 119 considered independently of its components is an abstraction or model. It is useful as a model, however, because mobile applications 108 and services such as a content service 130, a wireless communication device authentication service 134, and a payment service 136 interact with the mobile application framework 119 as if it were in fact a monolith or blackbox, interacting only with the mobile application framework API 110 or the mobile application framework server API 117 and unable to readily discern whether the mobile application framework 119 is implemented as a distributed system (e.g., as illustrated in FIG. 1) or is implemented as a self-contained system on a single execution platform such as the UE 102. Turning now to FIG. 2C, this "blackbox" view of the mobile application framework 119 is illustrated. Mobile applications 108 request and receive service through the mobile application framework API 110 and have no visibility into the blackbox of the mobile application framework 119 behind the mobile application framework API 110 or to the backend services 138 that are engaged to provide the requested service. Backend services 138, in a like manner, receive and reply to requests for its backend service through the mobile application framework server API 117 and have no visibility into the blackbox of the mobile application framework 119 behind the mobile application framework server API 117, no visibility into the mobile applications 108 (e.g., visibility beyond any visibility provided by the mobile application framework server API 117), and no visibility into other backend services 138 (e.g., visibility beyond any visibility provided by the mobile application framework server API 117).

With reference again to FIG. 1, the mobile application framework 119 may provide services to mobile applications 108 by composing services provided by one or more backend services 138 and/or computer systems. For example, a mobile application 108 may provide a communication service on the UE to a user that the mobile application framework 119 provides by composing services from a content service provider 130, a wireless communication device authentication service 134, and a payment service 136. The content service provider 130 may be a media service, a gaming server, a sports league, or other broker or provider of content. The payment service 136 may be a trusted service manager (TSM) associated with a credit card issuer, a credit card issuer itself, PayPal, or other payment services. The mobile application framework server application 114, via the mobile application framework server API 117, may interwork with the content service provider 130 in accordance with a mobile application framework service rule 118 to promote the content service provider 130 streaming content from the data store 132 to the UE 102, for example via a communication channel in a selected communication channel provided by a wireless service provider via the eNB 104 via a wireless link to the cellular transceiver 103 and there through to the mobile application 108 and/or to a display screen of the UE 102.

When a mobile application 108 invokes a service via the mobile application framework API 110, the mobile application framework API 110 may send a service request message to the mobile application framework server application 114 and/or the mobile application framework server API 117 comprising a variety of information. This information may be said to constitute a signature or index. The mobile application framework server application 114 or a business logic manager that is part of the mobile application framework 119 may use the signature contained in the service request message to perform security processes and/or to select and configure communication channels (for further details see U.S. Patent Application "Security Tiering in a Mobile Communication Device Application Framework" and U.S. Patent Application "Channel Selection in a Mobile Communication Device Application Framework," both of which are incorporated by reference above).

The mobile application 108 or business logic manager may further use the signature or a part of the signature to select one or more service rules 118 or service workflow definitions that define business rules or process steps to be performed to provide the requested service. A service rule 118 may define a sequence of separate process steps. Some of the process steps may be performed by the mobile application framework server application 114 or business logic manager independently, and some of the process steps may be performed by the mobile application framework server application 114 or business logic manager in collaboration with the mobile application framework client 112. Some of the process steps may be performed by invoking services provided by backend systems 138, for example by invoking services provided by the content service 130, by the wireless communication device authentication service 134, and the payment service 136.

Figure 3:
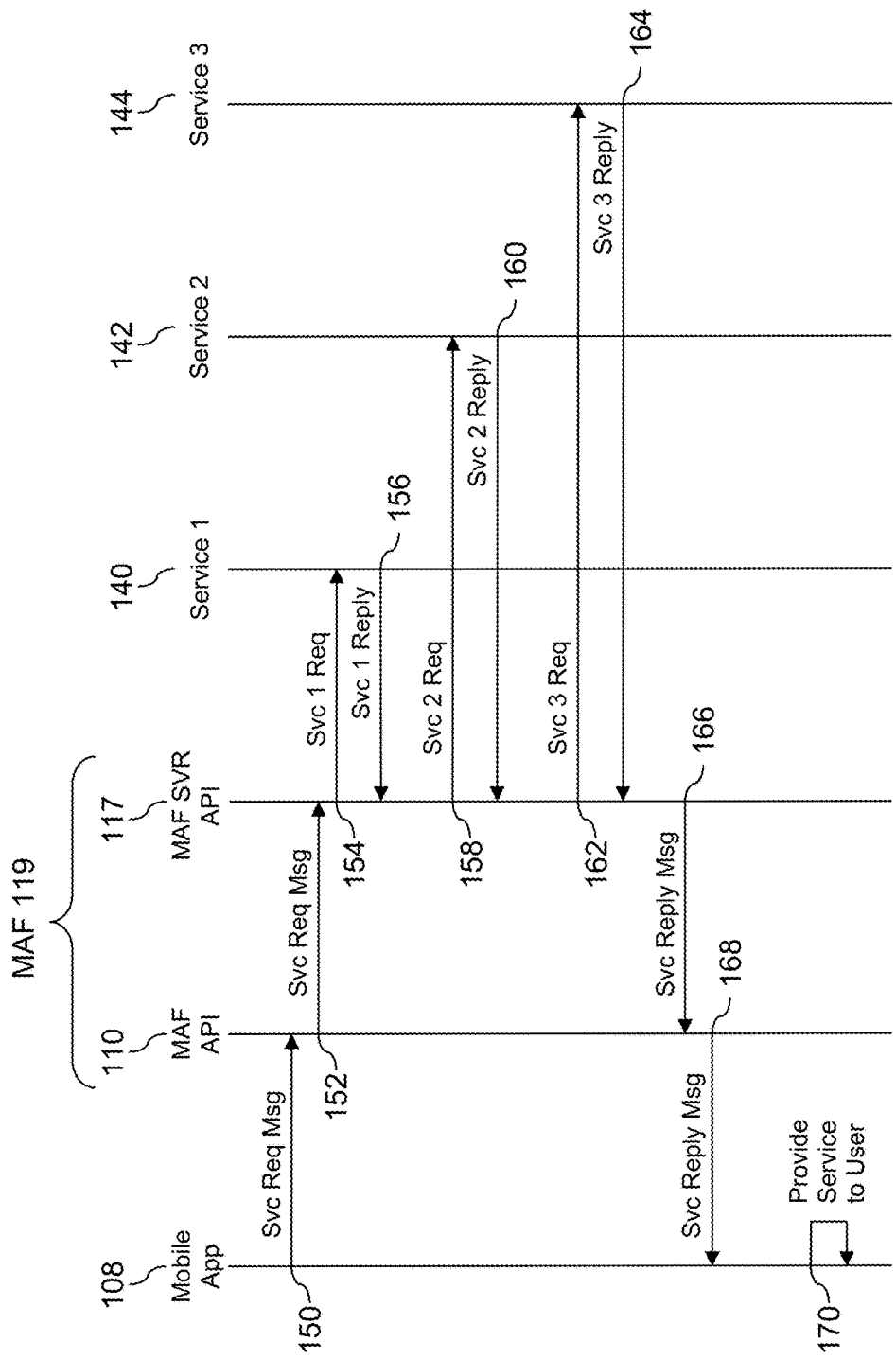
FIG. 3 is a message sequence diagram of a mobile application framework according to an embodiment of the disclosure.

Turning now to FIG. 3, an example workflow message sequence defined by a service rule 118 is now described. A mobile application 108 sends a service request message 150 to the mobile application framework API 110. The mobile application framework 119 acts on this request, illustrated by sending a service request message 152 from the mobile application framework API 110 to the mobile application framework server API 117. It is understood that the mobile application framework 119, for example the mobile application framework client 112 and/or the mobile application framework server application 114, may provide a variety of processing behind the APIs 110, 117 that face the external world, the mobile applications 108 and backend services 140, 142, 144, inside the "blackbox" of the mobile application framework 119. The view taken in FIG. 3 is concentrating on the communications and messaging sequence between the APIs 110, 117 and the external world of the mobile applications 108 and backend services 140, 142, 144. In an embodiment, the mobile application framework client 112 and the mobile application framework server application 114 may communicate with each other via JavaScript Object Notation (JSON) files.

In response to the service request message 152, the mobile application framework server API 117 engages in service request sessions with each of the services 140, 142, 144. For example, the mobile application framework server API 117 sends a service 1 request message to a first service 140 and receives a service 1 reply message from the first service 140; sends a service 2 request message to the second service 142 and receives a service 2 reply message from the second service 142; and sends a service 3 request message to the third service 144 and receives a service 3 reply message from the third service 144. After receiving a service reply and before sending a different service request, the mobile application framework server API 117 may interwork with the mobile application framework server application 114 and/or the mobile application framework client 112 before sending another service request. While FIG. 3 illustrates the service request sessions as sequential—the first service session completing before the second service session begins and the second service session completing before the third service session begins—in some embodiments service sessions may overlap in time.

After interworking with backend services 140, 142, 144 to provide the bundled service, the mobile application framework server API 117 sends a service reply message at label 166 to the mobile application framework API 110, and the mobile application framework API 110 sends a service reply message at label 168 to the mobile application 108. The service reply message at label 168 sent by the mobile application framework API 110 to the mobile application 108 may enable to the mobile application 108 to provide a communication service or premium communication service to a user of the UE 102 at label 170, for example streaming a video on the display screen of the UE 102.

With reference again to FIG. 1, a more specific example workflow is now described. This workflow is not inconsistent with that described with reference to FIG. 3, but here the focus is more on what processing may be performed by the mobile application framework 119, for example by the mobile application framework server application 114, during the workflow instead of focusing on the flow of messages. This example workflow may allow a mobile application 108 to provide a user of the UE 102 with a streamed content bundled service. The process workflow steps identified in the associated service rule 118 may indicate that the mobile application framework server application 114 or business logic manager is (1) to confirm with the wireless communication device authentication service 134 that the UE 102 is currently authenticated to receive communication service, (2) to complete a payment workflow with the payment service 136, and (3) to order a communication service from the content service 130. These three steps may be viewed as similar to the first service session (messages 154 and 156), the second service session (messages 158 and 160), and the third service session (messages 162 and 164), respectively, described above with reference to FIG. 3. Each of these three steps may themselves be composed of multiple steps and/or multiple methods invoked on the mobile application framework server API 117. Thus, between the initial service request (154, 158, or 162 in FIG. 3) sent by the mobile application framework server API 117 and the final service reply (156, 160, or 164 in FIG. 3) sent by the service to the mobile application framework server API 117, the subject service may invoke a plurality of methods or services of the mobile application framework 119 and/or the mobile application framework server application 114 via the mobile application framework server API 117 in pursuit of completing the subject service. In some contexts this may be referred to as iteratively executing mobile application framework operations or iteratively invoking methods on the mobile application framework server API 117. Alternatively, in some contexts this may be referred to as executing nested loops or nested calls of methods on the mobile application framework server API 117.

The mobile application framework server application 114 or business logic manager may invoke a method of the mobile application framework server API 117 to request an authentication of the UE 102 from the wireless communication device authentication service 134. The requested service may verify that the UE 102 is authorized for communication over a radio access network (RAN) of the wireless communication service provider that provides the wireless communication device authentication service 134. In some cases basic authentication of the UE 102 may have already been performed by a security functionality of the mobile application framework 119. The requested authentication service may dig deeper, for example determining a current location of the UE 102 and comparing that location as determined via the RAN to an indication provided by the mobile application 108 and sent by the mobile application framework server application 114 or business logic manager to the wireless communication device authentication service 134. The location determined by the RAN may be coarse grained for example limited to identifying an eNB 104 with which the UE 102 is associated by the RAN while the location provided by the mobile application 108 may be highly precise (i.e., a GPS coordinate). Such a coarse grained location comparison may be sufficient to determine if the UE 102 is spoofed or if the UE 102 is outside of an area where the requested content service is allowed.

The wireless communication device authentication service 134 may invoke a method of the mobile application framework server API 117 to obtain information pursuant to authenticating the UE 102 and/or the mobile application 108. For example, the service rule 134 may request that the mobile application framework client 112 pop-up a dialog box on the display of the UE 102 that prompts the user to enter a personal identification number (PIN) or a biometric. The information may be propagated by the mobile application framework 119 back to the wireless communication device authentication service 134 and compared against a previously stored user PIN or biometric.

After successfully completing authentication via the wireless communication device authentication service 134, the mobile application framework server application 114 or business logic manager may use the mobile application framework server API 117 to send a payment transaction message to the payment service 136 via the network 106. The message may identify a third party such as a third party that provides the content service 130, for example identifying a bank account associated with that third party. The message may identity an amount of money to charge to the account. The message may identify the kind of service that the payment is associated with, for example to support addressing a user's inquiry later about why his or her account was charged. The payment service 136 may invoke one or more methods of the mobile application framework server API 117 to satisfy payment conditions or security conditions before completing the requested payment transaction. The payment service 136 may invoke a method of the mobile application framework server API 117 that causes the mobile application framework client 112 to pop-up a dialog on the UE 102 notifying the user of a payment amount that will be charged to the user's account managed by the payment service 136 and prompting the user to approve the payment. The dialog box may further prompt the user to enter a PIN employed by the user to secure his or her payment account. The dialog box may prompt the user to enter a location of the user. Any information input by the user of the UE 102 may be propagated by the mobile application framework client 112 to the mobile application framework server API 117, and from the mobile application framework server API 117 to the payment service 136.

Alternatively, the payment service 136 may invoke a method of the mobile application framework server API 117 to provide a warrant that two factor authentication of the user of the UE 102 has been performed successfully and delegate the details of such two factor authentication to the mobile application framework 119. Two factor authentication may be provided in a variety of ways. Two factor authentication may consist in (1) having the UE 102 (e.g., the UE 102 is authenticated and not spoofed) and (2) knowing something that only the legitimate user of the UE 102 knows (e.g., a PIN). Alternatively, the second factor could be providing something, such as a biometric, that only the legitimate user of the UE 102 can provide. This kind of abstracted authentication, where the details are left to the mobile application framework 119, may save time of performing authentications for each of the backend services 140 or 142 and 144. The payment service 136 may complete the payment transaction and send a payment transaction number to the mobile application framework server API 117.

After completing the payment transaction via the payment service 136, the mobile application framework server application 114 or business logic manager may invoke the mobile application framework server API 117 to command or order the delivery or to command queuing up of the delivery of a service, for example content delivery from the content service 130. The content service may be streaming a movie. The content service 130 may be providing an audio and/or video feed providing premium access during a sporting event, for example audio from a pit crew manager in a car race, audio from a player, special commentary by a celebrity or expert observer. The mobile application framework server API 117 may send a message to the content service 130 commanding or ordering the service. The message may identify the UE 102, the mobile application 108, and/or a type of the UE 102. The message may provide a payment transaction number that the content service 130 may use to confirm payment has been completed prior to proceeding forwards.

The content service 130 may invoke other methods of the mobile application framework server API 117 pursuant to responding to the service command or service order. The content service 130 may request an identity from the mobile application 108, and the mobile application framework server API 117 and/or the mobile application framework server application 114 may interact with the mobile application framework client 112 to obtain the requested identity via the mobile application framework API 110 interworking with the subject mobile application 108. The content service 130 may invoke another method of the mobile application framework server API 117 to determine a location of the UE 102 and/or a service region associated with the UE 102 (e.g., a region within which the UE 102 is provided wireless communication service, for example within the United States but not out-of-country). When the content service 130 has completed its workflow, it may return a service token to the mobile application framework server API 117, and the mobile application framework server API 117 may send this service token to the mobile application framework client 112. The mobile application framework client 112 may send this to the subject mobile application 108 via the mobile application framework API 110. The mobile application 108 may later use the service token to connect directly to the content service 130 to receive streamed content. Alternatively, the mobile application 108 may access the content service 130 via the mobile application framework 119, wherein the mobile application framework 119 may provide streamed content connection to the UE 102 via a selected communication channel, for example a communication channel that does not accumulate data traffic against a periodic data toll of the UE 102. In either example, the content service 130 may, at the time the service token is activated to access the content, may invoke a method of the mobile application framework server API 117 to determine the location of the UE 102 at that time, to avoid violating any rules or laws regarding transmission of content that may apply in particular regions or venues.

In an embodiment, a packaged of bundled service may be agreed upon and promoted through the several services. For example, a wireless service provider may agree to provide streamed data communication service without tolling this to a bill of the user of the UE 102, for example because the wireless service provider obtains compensating revenue from advertisement sponsors. The content service provider may offer a special discounted price for the streamed content, for example to educate a critical mass of wireless communication service subscribers about the streaming content service in hopes that they will become repeat customers in the future even without discounted service.

It will be appreciated that a template for such a packaged or bundled communication service delivery can be defined to match a plurality of actual situations. For example, a second bundled content service may identify a different content service and a different payment service. For example, a third bundled content service may identify a different content to be accessed from the content service 130, available to a sub-set of users of UE 102, at a different price point. Each of these three bundled content service examples may be supported by a single service rule 118 or service template. For other situations that do not fit this template, an independent template for the different situation can be defined. To each such service template a different service rule 118 may be defined and configured into the mobile application framework 119. Thus, the mobile application framework 119 is readily extensible and provides a uniform interface to services that can use the mobile application framework 119 to provide composed services without integrating with each other. The mobile application framework 119 can ease the process of developing and deploying beneficial and desired communication services.

This paradigm of service delivery and service extension may be contrasted with what was previously done. Previously services would have to integrate with each other. Thus, direct communication links may have been designed between each of the different actors described above—between the mobile application 108, the wireless service provider authentication service 134, the payment service 136, and the content service provider 130. These direct communication links may result in convoluted, spaghetti-like paths that are inherently difficult to test and difficult to make robust. If something changed, the other actors might need to change their software and/or workflows. If a new service is desired to be deployed, the actors may need to completely re-invent the wheel, as it were, to construct the new service, partly because one or more of the actors involved might be different. Testing such a complicated integrated system is time consuming and expensive. This slows deployment of new services and raises the bar, due to the elevated cost, for what new services may be rationally or profitably developed and deployed. Such integrated systems tend to be brittle and more prone to complicated failure modes. The mobile application framework 119 taught herein reduces many if not all of these obstacles and/or problems.

Figure 4:
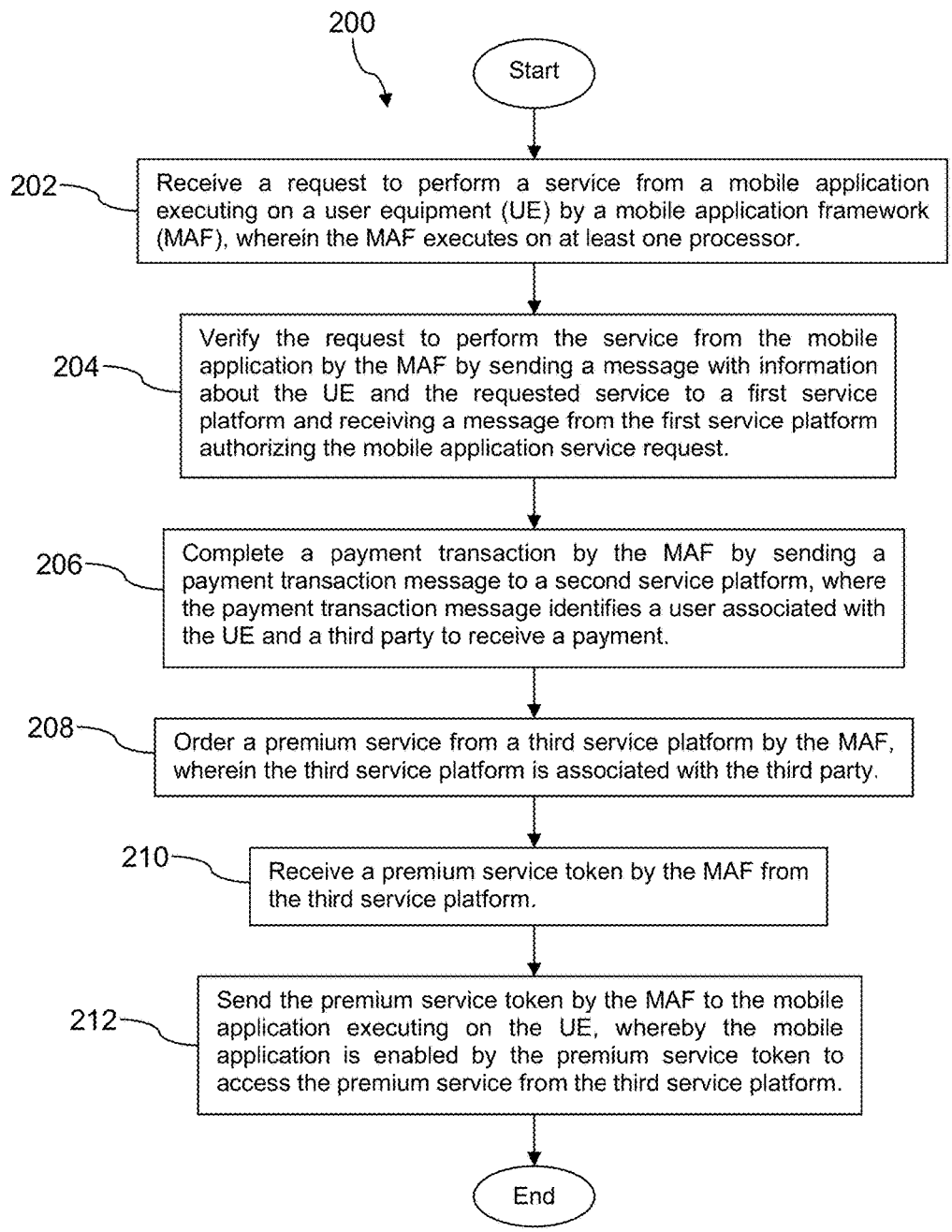
FIG. 4 is a flow chart of a method according to an embodiment of the disclosure.

Turning now to FIG. 4, a method 200 is described. The method 200 may be employed to provide a mobile application service on a UE based on composing a plurality of services supported by service platforms executing in a backend of a communication network. At block 202, a mobile application framework receives a request to perform a service from a mobile application executing on a user equipment (UE), wherein the mobile application framework executes on at least one processor. In an embodiment, the mobile application framework 119 executes on the UE 102 (e.g., as illustrated in FIG. 2B). Alternatively, in a different embodiment, the mobile application framework 119 executes on at least one UE 102 and on the sever 116 (e.g., as illustrated in FIG. 2A).

The request to perform a service may be a request to receive a communication service or a premium content service. The request may be received by the mobile application framework API 110 and may contain information embedded or stored in parameters of the request. The request information along with the specific method invoked may be said to constitute a service request signature or a service request profile. The mobile application framework 119 may use this service request signature or profile to map to and/or to select one service rule from among the plurality of the service rules 118. The selected service rule identifies or defines a workflow and/or sequence of services and/or backend services that is to be executed to perform the requested service.

At block 204, the mobile application framework verifies the request to perform the service from the mobile application by sending a message with information about the UE and the requested service to a first service platform and receiving a message from the first service platform authorizing the mobile application service request. At block 206, the mobile application framework completes a payment transaction by sending a payment transaction message to a second service platform, where the payment transaction message identifies a user associated with the UE and a third party to receive a payment.

Figure 5:
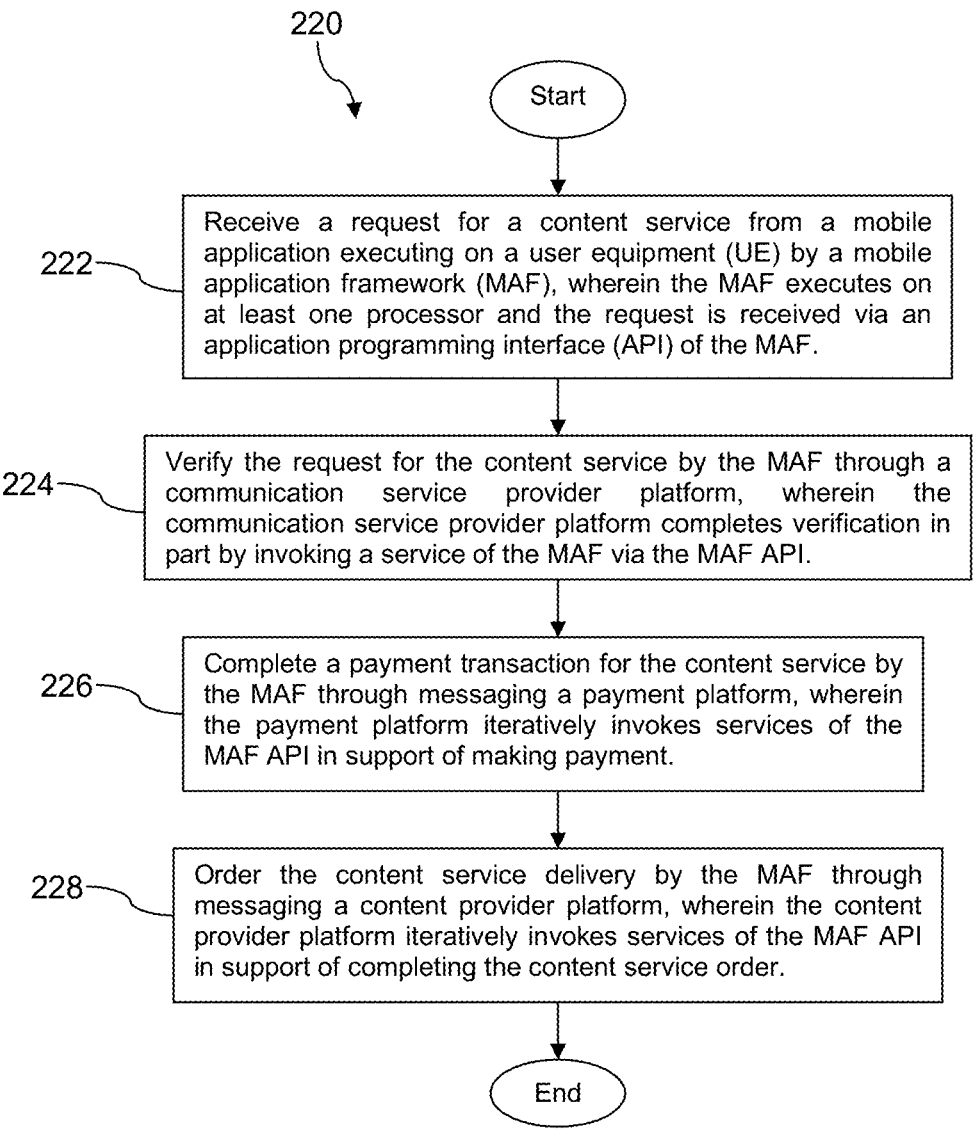
FIG. 5 is a flow chart of another method according to an embodiment of the disclosure.

At block 208, the mobile application framework orders a premium service from a third service platform, wherein the third service platform is associated with the third party. At block 210, the mobile application framework receives a premium service token from the third service platform. At block 212, the mobile application framework sends the premium service token to the mobile application executing on the UE, whereby the mobile application is enabled by the premium service token to access the premium service from the third service platform Turning now to FIG. 5, a method 220 is described. The method 220 may be employed to provide a mobile application service on a UE based on composing a plurality of services supported by service platforms executing in a backend of a communication network. At block 222, a mobile application framework receives a request for a content service from a mobile application executing on a user equipment (UE), wherein the mobile application framework executes on at least one processor and the request is received via an application programming interface (API) of the mobile application framework. At block 224, the mobile application framework verifies the request for the content service through a communication service provider platform, wherein the communication service provider platform completes verification in part by invoking a service of the mobile application framework via the mobile application framework API. For example, the mobile application framework 119 may receive a request for one of a personal identification number (PIN) and a biometric by the mobile application framework API from the communication service provider platform. The mobile application framework client 112, in response to the request, may cause a dialog box to pop-up on a display of the UE 102, where the dialog box prompts for input of one of the PIN or the biometric. The user may provide the PIN or biometric using the UE 102, and the mobile application framework 119 may receive the input of one of the PIN or the biometric. The mobile application framework 119, for example the mobile application framework server API 117, may transmit the PIN or the biometric to the communication service provider platform, wherein the communication service provider platform completes verification in part based on the PIN or the biometric.

At block 226, the mobile application framework completes a payment transaction for the content service through messaging a payment platform, wherein the payment platform iteratively invokes services of the mobile application framework API in support of making payment. Some of the iterations may include requesting two factor authentication and requesting identification of a product that is being purchased. For example, the payment platform may invoke a method on the mobile application framework server API 117 to provide a warrant that two factor authentication of the UE 102 and/or the user of the UE 102 has been performed. The mobile application framework 119 may perform the two factor authentication (or may have performed earlier) and replies to the payment platform with an appropriate warrant, for example a digital signature identifying that two factor authentication had been successfully completed in the subject payment transaction for the user and UE 102. As another example, the payment platform may invoke a method on the mobile application framework server API 117 to identify a product or service that is the object of the payment transaction. The mobile application framework 119 may send a reply to the payment platform that identifies the product or service.

At block 228, the mobile application framework orders the content service delivery through messaging a content provider platform, wherein the content provider platform iteratively invokes services of the mobile application framework API in support of completing the content service order. The content provider platform may invoke the mobile application framework server API 117 one or more times to determine information. For example, the content provider may request an identification of a model of the UE 102, whereby the content provider platform may determine a suitable version or transcoded image of the requested content. The content provider platform may request a location of the UE 102 to avoid violating any rules, commercial agreements, or enterprise policies in delivering content to the UE 102 in a forbidden locale.

Figure 6A:
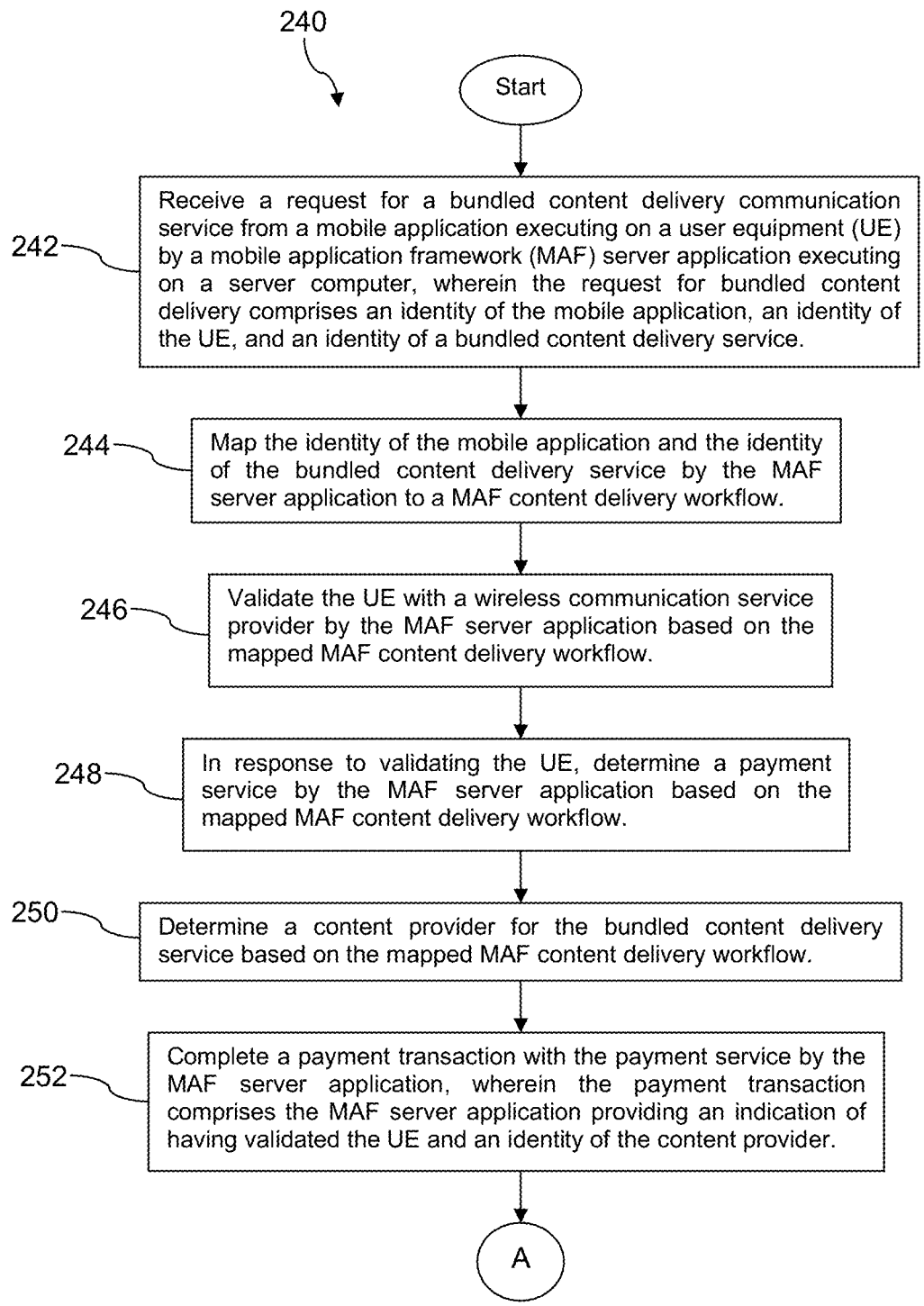
FIG. 6A and FIG. 6B are a flow chart of yet another method according to an embodiment of the disclosure.
Figure 6B:
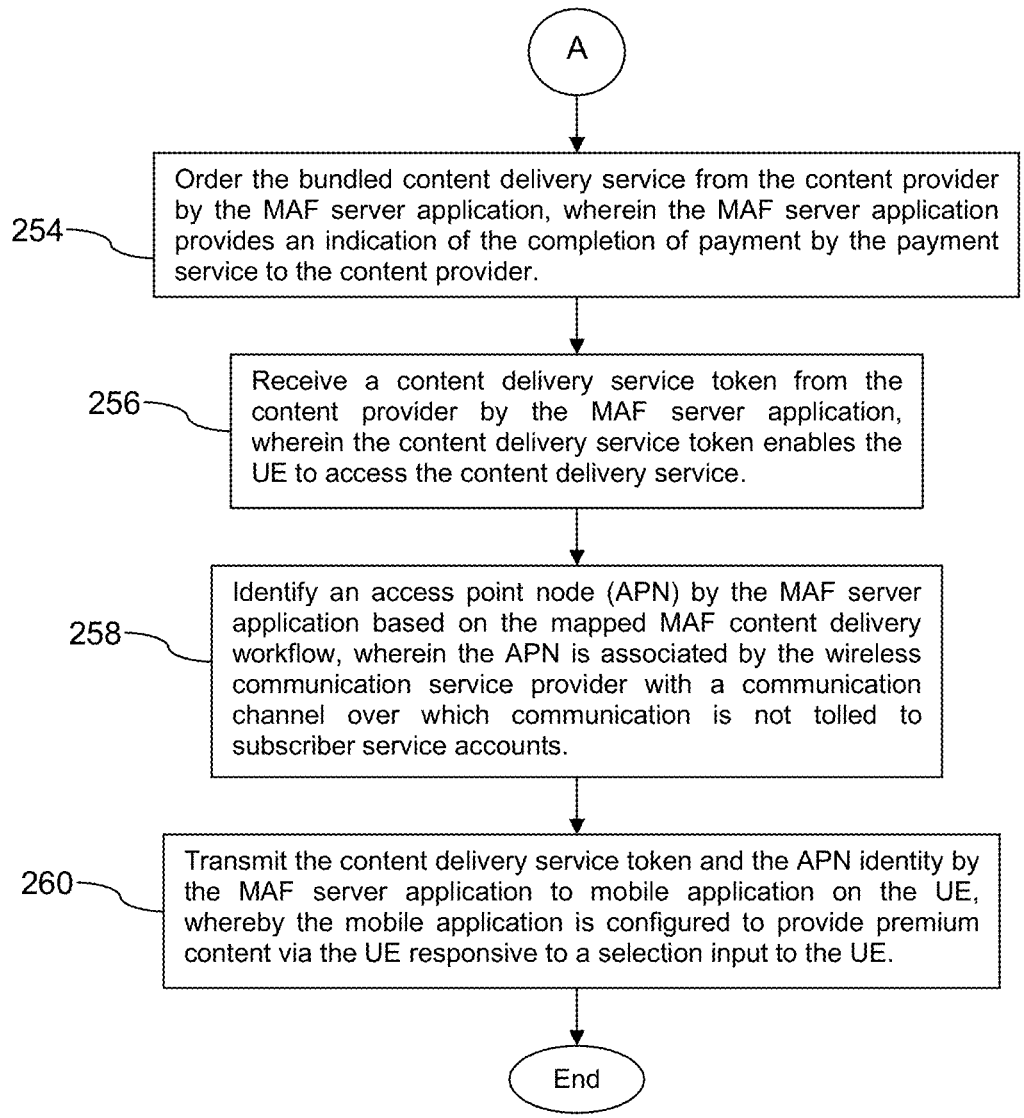

Turning now to FIG. 6A and FIG. 6B, a method 240 is described. The method 240 may be employed to provide a bundled content delivery communication service on a UE. At block 242, a mobile application framework server application receives a request for a bundled content delivery communication service from a mobile application executing on a user equipment (UE), wherein the mobile application framework server application executes on a server computer and wherein the request for bundled content delivery comprises an identity of the mobile application, an identity of the UE, and an identity of a bundled content delivery service. At block 244, the mobile application framework server application maps the identity of the mobile application and the identity of the bundled content delivery service to a mobile application framework content delivery workflow. At block 246, the mobile application framework server application validates the UE with a wireless communication service provider based on the mapped mobile application framework content delivery workflow.

At block 248, in response to validating the UE, the mobile application framework server application determines a payment service based on the mapped mobile application framework content delivery workflow. At block 250, determine a content provider for the bundled content delivery service based on the mapped mobile application framework content delivery workflow. At block 252, the mobile application framework server application completes a payment transaction with the payment service, wherein the payment transaction comprises the mobile application framework server application providing an indication of having validated the UE and an identity of the content provider.

At block 254, the mobile application framework server application orders the bundled content delivery service from the content provider, wherein the mobile application framework server application provides an indication of the completion of payment by the payment service to the content provider. At block 256, the mobile application framework server application receives a content delivery service token from the content provider, wherein the content delivery service token enables the UE to access the content delivery service.

At block 258, the mobile application framework server application identifies an access point node (APN) based on the mapped mobile application framework content delivery workflow, wherein the APN is associated by the wireless communication service provider with a communication channel over which communication is not tolled to subscriber service accounts. At block 260, the mobile application framework server application transmits the content delivery service token and the APN identity to mobile application on the UE, whereby the mobile application is configured to provide premium content via the UE responsive to a selection input to the UE.

Figure 7:
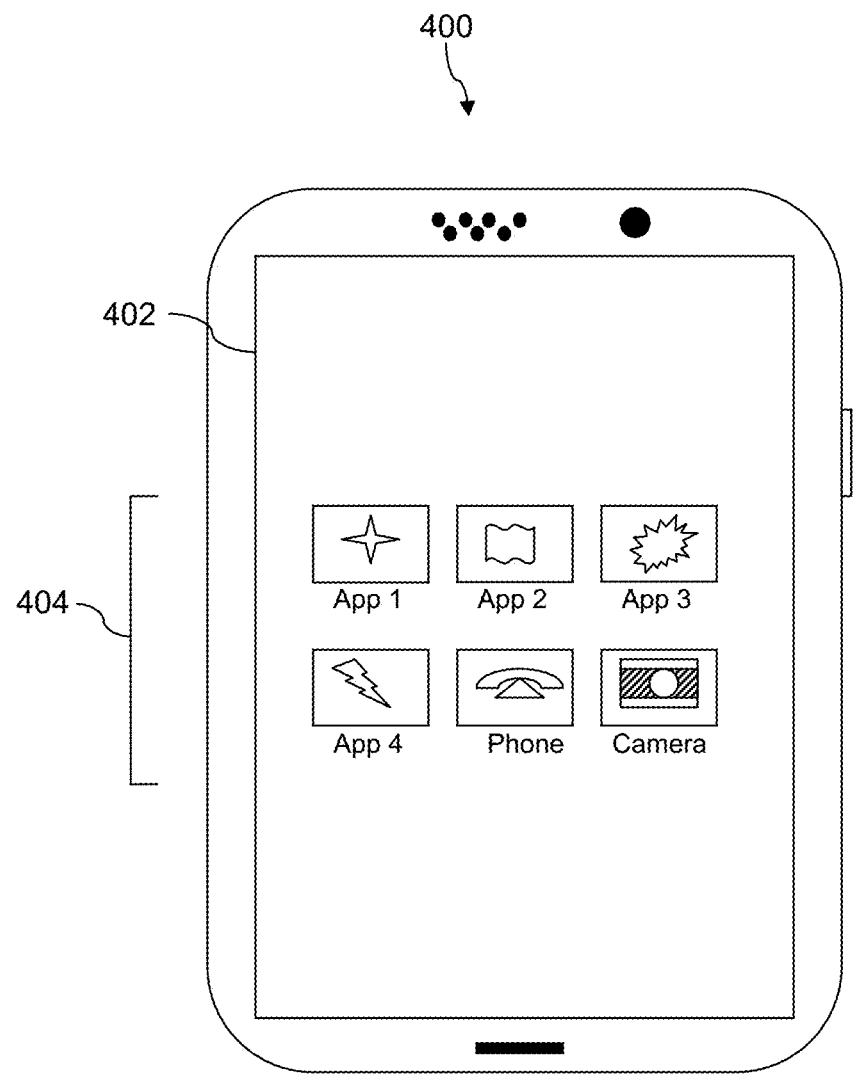
FIG. 7 is an illustration of a handset according to an embodiment of the disclosure.

FIG. 7 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 8:
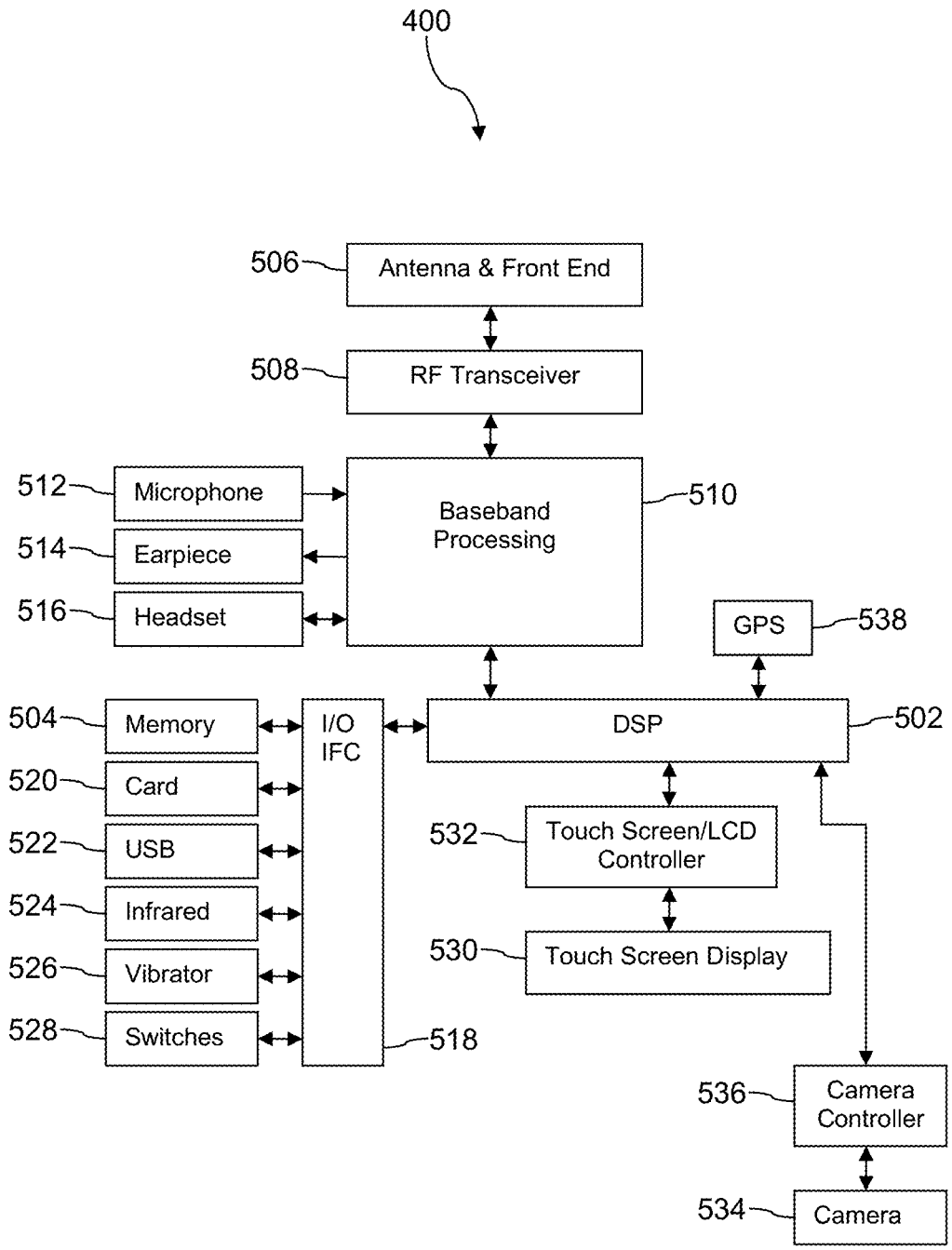
FIG. 8 is a block diagram of a hardware architecture of a mobile communication device according to an embodiment of the disclosure.

FIG. 8 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 9A:
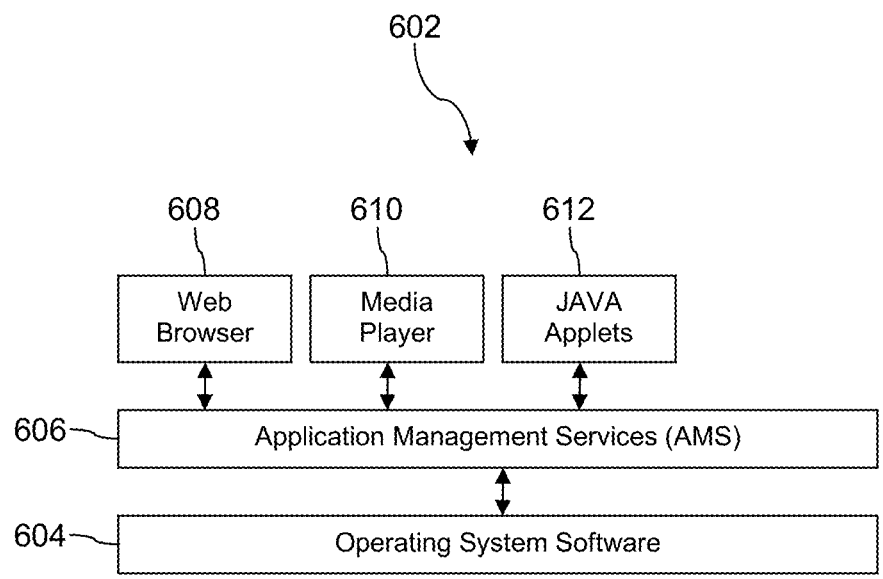
FIG. 9A is a block diagram of a software architecture of a mobile communication device according to an embodiment of the disclosure.

FIG. 9A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 9A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 9B:
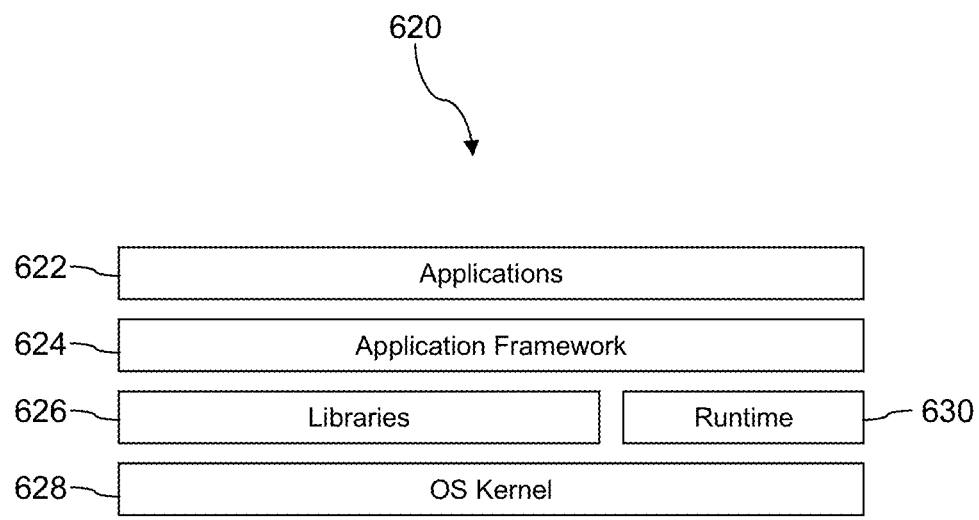
FIG. 9B is a block diagram of another software architecture of a mobile communication device according to an embodiment of the disclosure.

FIG. 9B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 10:
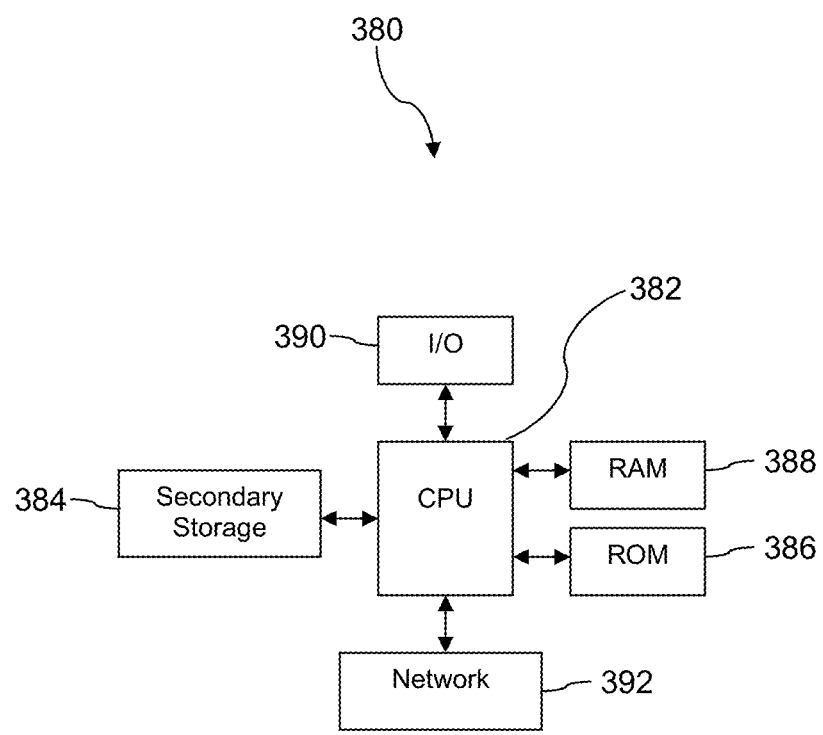
FIG. 10 is a block diagram of a computer system according to an embodiment of the disclosure.

FIG. 10 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of providing a bundled content delivery communication service on a user equipment (UE), comprising:

receiving a request for a bundled content delivery communication service from a mobile application executing on a user equipment (UE) by a mobile application framework server application (server application) executing on a server computer, wherein the request for bundled content delivery comprises an identity of the mobile application, an identity of the UE, and an identity of a bundled content delivery service;

mapping the identity of the mobile application and the identity of the bundled content delivery service by the server application to a mobile application framework content delivery workflow;

validating the UE with a wireless communication service provider by the server application based on the mapped mobile application framework content delivery workflow;

in response to validating the UE, determining a payment service by the server application based on the mapped mobile application framework content delivery workflow;

determining a content provider for the bundled content delivery service by the server application based on the mapped mobile application framework content delivery workflow;

completing a payment transaction with the payment service by the server application, wherein the payment transaction comprises the server application providing an indication of having validated the UE and an identity of the content provider;

ordering the bundled content delivery service from the content provider by the server application, wherein the server application provides an indication of the completion of payment by the payment service to the content provider;

receiving a content delivery service token from the content provider by the server application, wherein the content delivery service token enables the UE to access the content delivery service;

identifying an access point node (APN) by the server application based on the mapped mobile application framework content delivery workflow, wherein the APN is associated by the wireless communication service provider with a communication channel over which communication is not tolled to subscriber service accounts; and transmitting the content delivery service token and the APN identity by the server application to the mobile application on the UE, whereby the mobile application is configured to provide premium content via the UE responsive to a selection input to the UE.

2. The method of claim 1, wherein the UE is one of a mobile phone, a personal digital assistant (PDA), a media player, a wearable computer, a headset computer, a laptop computer, a tablet computer, a notebook computer, a set-top box, or a gaming system.

3. The method of claim 1, wherein the UE is associated with a wireless communication service subscribe account maintained by the wireless communication service provider.

4. The method of claim 1, wherein the payment service is one of a credit card trusted service manager (TSM), a credit card issuer, or a PayPal service.

5. The method of claim 1, wherein the premium content is a digitally streamed movie.

6. The method of claim 1, wherein the premium content is live audio feed from a sporting event.

7. The method of claim 1, wherein the communication channel comprises a wireless communication link provided based on a long term evolution (LTE), a code division multiple access (CDMA), a global mobile communication system (GSM), or a worldwide interoperability for microwave access (WiMAX) wireless communication protocol.

* * * * *